Figure 1:
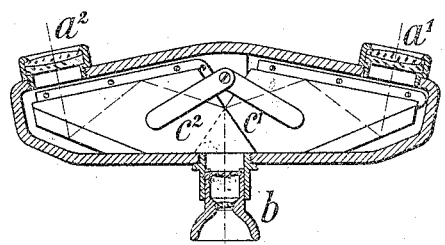

No. 880,028. PATENTED FEB. 25, 1908.
A. KÖNIG.
TELESCOPE.
APPLICATION FILED MAY 25, 1907.

Witnesses:
Paul Krüger
Fritz Sander

Inventor:
Albert König

UNITED STATES PATENT OFFICE.

ALBERT KÖNIG, OF JENA, GERMANY, ASSIGNOR TO THE FIRM OF CARL ZEISS, OF JENA, GERMANY.

TELESCOPE

No. 880,028.     Specification of Letters Patent.     Patented Feb. 25, 1908.

Application filed May 25, 1907. Serial No. 375,605.

*To all whom it may concern:*

Be it known that I, ALBERT KÖNIG, doctor of philosophy, a citizen of the German Empire, and residing at Carl-Zeiss strasse, Jena, in the Grand Duchy of Saxe-Weimar, Germany, have invented a new and useful Telescope, of which the following is a specification.

In the use of a terrestrial telescope the observer often wishes, that the field of view might be extended further in one direction, for example, in the horizontal direction, while at the same time he is aware, that the extent of the field of view in the direction at right angles to the first is greater than is necessary. According to the present invention, these facts can be given practical effect by reducing the field of view in the unimportant direction, so that it becomes oblong (that is to say, showing any figure longer in one direction than in the other) and adding to the first a second oblong field of view long side to long side, so that the short axis of one field of view is in a straight line with the short axis of the other, the two object fields, reproduced in the two fields of view, lying each in the prolongation of the other, with or without a space occurring between them. If the observer would have the full benefit of such a doubling, both fields of view must be visible from the same eye point. In case the horizontal direction is the important one, as in the following will always be supposed, the oblong fields of view lie immediately or with slight interval one above the other, and each object field extends along the horizon. If each object field has to be a continuation of the other, this purpose is evidently no less attained when the middle portion of the total image occurs in both fields of view, due to both object fields somewhat overlapping each other. If the continuation of the first object field come not at all in question, but that two separated object fields are to be observed, the prescribed angular distance between the two object fields will be in general considerable. If this angle have the greatest value, 180°, the observer may see, for instance, in one field of view what lies directly in front of him, in the other what lies behind him.

Instruments, which almost completely satisfy the conditions of the present invention, are the two-fold telescopes of the well-known coincidence telemeters, in which the line separating the two semicircular fields of view lies in the direction of the base line. They require but two modifications. Firstly, the adjustment must deviate from the ordinary in such a way that the object fields reproduced lie equally high. Secondly, one of the two objective reflectors must undergo such horizontal rotation that the two object fields include different portions of the horizon. Besides these small deviations from the two-fold telescope of the coincidence telemeter, which are necessary, there are, however, greater ones desirable for the better adaptation of the instrument to the new purpose. A large distance, for instance, between the entrance openings of the two telescopes and the position of these openings in the same horizontal plane are no longer of any advantage. But it may be expedient to have these openings lying higher than the ocular common to both telescopes, for instance, in the case where one telescope is to be used to look towards the rear. If the difference of level between the objectives and the ocular be greater than the focal length of the objectives, reversing lenses to erect the images are best to be used, in the place of which a single one common to both telescopes can also enter. Inversely, if specially large fields of view are to be provided, the common ocular is appropriately substituted by two oculars, one for each telescope, the axes of which are then so greatly inclined one to another that the requisition, that the two telescopes have a common eye-point, is fulfilled. Finally, the two fields of view also need no longer be two semicircles, forming as a whole a full circle, but rather may appear as rectangular or elliptical fields.

Figure 2:
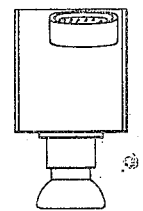
Figure 3:
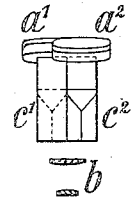
Figure 4:
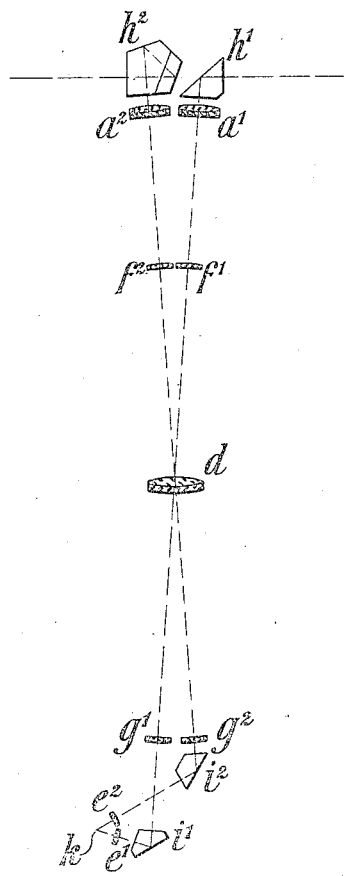

In the annexed drawing: Figure 1 is a sectional plan view of a two-fold telescope constructed according to the invention. Fig. 2 is a side view of this instrument. Fig. 3 is the same side view, but restricted to the optical parts. Fig. 4 is a sectional side view of the optical parts of another two-fold telescope constructed according to the invention.

The example represented in the three first figures is illustrative of the case, in which the two horizontal object fields are in continuity one to another. The sectional plan view in Fig. 1 and the side view in Fig. 2 show that no vertical axis of rotation is provided at the casing for sweeping the horizon, but the double telescope is considered a hand instrument. According to the side view of the optical parts in Fig. 3 the objectives $a^1$ $a^2$ are arranged at different levels and with an inclination of the axes relatively to each other, which inclination is equal to the angle, through which the optical construction chosen causes each object field to extend itself horizontally. Each objective is shown to be arranged on that side of the axis of the common ocular $b$, on which the object field lies, to which it is turned. This arrangement being chosen, the sense is given, in which the image-erecting prisms $c^1$ $c^2$ must deviate from parallel vision. Both prisms overlap one another with their ends, which serve as exit of the pencil, so as to be in contact in the horizontal plane, which includes the ocular axis and from which the objective axes stand equally wide apart. On the exit surfaces of the prisms the erected images lie, consequently also the eventual diaphragms of the fields of view are to be adapted. Another reversing system can enter in the place of those represented, also such, in which the last reflection of the optical axis takes place in the vertical instead of the horizontal plane. There is nothing to prevent the union of two instruments for two-eyed-use. This holds good also for the second example, Fig. 4. In this two-fold telescope the object fields lie 180° apart, one in front and the other towards the rear. The instrument has its greatest dimension in the vertical direction, so that light from the object field in the rear enters above the head of the observer. Terrestrial oculars, the reversing lens $d$ of which is common, serve to re-erect the images, while, in contradistinction to the first example, separate eye-lenses $e^1$ $e^2$ are arranged. The inverted images projected from the objectives $a^1$ $a^2$ lie in the collective lenses $f^1$ $f^2$ and are once again reproduced through the common reversing lens $d$. These images, now erect, lie in the hinder collective lenses $g^1$ $g^2$, which form with the eye-lenses $e^1$ $e^2$ the oculars proper. While in the telescope directed towards the front two simple reflecting prisms $h^1$ $i^1$ perform the two opposite deflections of the optical axis without disturbing the erect position of the image, in the retrospective telescope three reflections in the vertical plane are necessary, if the image is not to appear upside down. With three such reflections, however, objects in the rear would appear as viewed in a mirror, that is to say, the right in the image would be that lying behind the right shoulder. In order to lay the image of the restrospective telescope, as the objects would appear when the observer turned round and viewed them with the naked eye, lateral inversion must be provided for in the instrument, and this can be done by substituting a ridge surface for one of the three simple reflecting surfaces. Thus with the simple ocular prism $i^2$ an objective prism $h^2$ has been combined, which latter presents at first a simple reflecting and afterwards a ridge surface to the entering rays. The most suitable form for the two fields of view appears to be the elliptical one. To produce elliptical fields of view, the front collective lenses $f^1$ $f^2$ or the hinder ones $g^1$ $g^2$ or, best of all, both, should be given this form; by doing so the short axes would lie in the plane of the drawing. The entrance-and-exit surfaces of the ocular prisms $i^1$ $i^2$ may then suitably receive the rectangular instead of the square shape, and the eye-lenses $e^1$ $e^2$ would also become elliptical with a view of enabling the two fields of view to be brought as close together as possible. The centers of the two exit pupils fall in the point $k$ of intersection of the optical axes.

I claim:

1. In a two-fold telescope having the entrance axes inclined to each other the combination with two objectives of two image reversing systems adapted to bring the images into juxtaposition in a direction approximately perpendicular to the directions of the entrance axes, and an ocular system having a single eye-point.

2. In a two-fold telescope having the entrance axes inclined to each other the combination with two objectives of two image reversing systems adapted to bring the images into juxtaposition in a direction approximately perpendicular to the directions of the entrance axes, and two oculars inclined to each other so that their eye-points coincide.

3. A two-fold telescope with the entrance axes in the horizontal plane and inclined to each other, comprising two objectives, two terrestrial oculars having a common reversing lens and a common eye-point, and two systems of reflecting prisms adapted to raise the entrance axis above the eye-point and to locate the images one closely above the other.

4. A two-fold telescope with the entrance axes in the horizontal plane, comprising two objectives, two terrestrial oculars which have a common reversing lens and a common eye-point, and two prism systems adapted to raise the entrance axes above the eye-point, the optical axes of the two single telescopes lying in the same vertical plane and one prism system being retrospective.

ALBERT KÖNIG.

Witnesses:
PAUL KRUGER,
FRITZ SANDER.